(12) United States Patent
Appia et al.

(10) Patent No.: US 9,774,833 B2
(45) Date of Patent: Sep. 26, 2017

(54) PROJECTOR AUTO-FOCUS CORRECTION WITH THE AID OF A CAMERA

(71) Applicant: Texas Instruments Incorporated, Dallas, TX (US)

(72) Inventors: Vikram VijayanBabu Appia, Dallas, TX (US); Pedro Gelabert, Allen, TX (US); Aziz Umit Batur, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/318,590

(22) Filed: Jun. 28, 2014

(65) Prior Publication Data

US 2015/0022697 A1    Jan. 22, 2015

Related U.S. Application Data

(60) Provisional application No. 61/846,769, filed on Jul. 16, 2013.

(51) Int. Cl.
*H04N 9/31* (2006.01)
*G02B 7/32* (2006.01)
*G02B 7/36* (2006.01)

(52) U.S. Cl.
CPC ............ *H04N 9/317* (2013.01); *G02B 7/32* (2013.01); *G02B 7/36* (2013.01); *H04N 9/3173* (2013.01); *H04N 9/3194* (2013.01)

(58) Field of Classification Search
CPC .... H04N 9/317; H04N 9/3185; H04N 9/3188; H04N 3/3194; H04N 5/7458; H04N 5/23212; H04N 5/2628; H04N 5/2226; H04N 2005/7466; H04N 13/0253; G02B 26/0833; G02B 7/32
USPC .................................... 348/240.99
See application file for complete search history.

(56) References Cited

U.S. PATENT DOCUMENTS

| | | | | |
|---|---|---|---|---|
| 5,803,570 A | * | 9/1998 | Chen | H04N 9/3185 348/745 |
| 6,195,473 B1 | * | 2/2001 | Zable | G06T 3/4023 358/447 |
| 6,332,044 B1 | * | 12/2001 | Loce | G06T 5/20 382/205 |
| 8,330,822 B2 | * | 12/2012 | McEldowney | A63F 13/213 315/309 |
| 8,665,361 B1 | * | 3/2014 | Rangarajan | H04N 5/2256 348/222.1 |

(Continued)

OTHER PUBLICATIONS

"Using the DLP Pico 2.0 Kit for Structured Light Applications", DLPA021A, Texas Instruments Incorporated, Jan. 2010, revised Oct. 2011, pp. 1-21.

(Continued)

*Primary Examiner* — Pritham Prabhakher
(74) *Attorney, Agent, or Firm* — Gregory J. Albin; Charles A. Brill; Frank D. Cimino

(57) ABSTRACT

A method of automatically focusing a projector in a projection system is provided that includes projecting, by the projector, a binary pattern on a projection surface, capturing an image of the projected binary pattern by a camera synchronized with the projector, computing a depth map from the captured image, and adjusting focus of the projector based on the computed depth map.

9 Claims, 5 Drawing Sheets

(56) References Cited

U.S. PATENT DOCUMENTS

| | | | | |
|---|---|---|---|---|
| 8,681,255 B2* | 3/2014 | Katz | H04N 9/3182 | 348/333.01 |
| 8,836,756 B2* | 9/2014 | Park | H04N 13/0253 | 348/42 |
| 9,462,255 B1* | 10/2016 | Marason | G01B 11/25 | |
| 9,602,807 B2* | 3/2017 | Crane | H04N 13/0253 | |
| 2008/0130015 A1* | 6/2008 | Lu | G01B 11/25 | 356/610 |
| 2010/0007717 A1* | 1/2010 | Spektor | G06K 9/00355 | 348/43 |
| 2010/0214540 A1 | 8/2010 | Sajadi et al. | | |
| 2010/0231811 A1* | 9/2010 | Sajadi | H04N 9/3185 | 348/745 |
| 2010/0328453 A1* | 12/2010 | Kiesshauer | G03B 21/53 | 348/135 |
| 2011/0050859 A1* | 3/2011 | Kimmel | G01B 11/2509 | 348/50 |
| 2012/0075534 A1* | 3/2012 | Katz | H04N 9/3182 | 348/602 |
| 2012/0162385 A1* | 6/2012 | Park | H04N 13/0253 | 348/47 |
| 2012/0249740 A1* | 10/2012 | Lee | H04N 13/0207 | 348/46 |
| 2013/0057655 A1* | 3/2013 | Su | G02B 7/30 | 348/47 |
| 2013/0215235 A1* | 8/2013 | Russell | H04N 13/0203 | 348/47 |
| 2014/0028801 A1* | 1/2014 | Tin | G01N 21/55 | 348/46 |
| 2014/0098246 A1* | 4/2014 | Yi | H04N 5/232 | 348/207.1 |
| 2014/0168369 A1* | 6/2014 | Crane | H04N 13/0253 | 348/46 |
| 2014/0354681 A1* | 12/2014 | Xiong | G06T 7/00 | 345/619 |

OTHER PUBLICATIONS

Vikram Vijayanbabu Appia, "Hierarchical Binary Structured Light Patterns", United States Patent Application No. 14/312,549, filed on Jun. 23, 2014, pp. 1-24.

* cited by examiner

PROJECTOR AUTO-FOCUS CORRECTION WITH THE AID OF A CAMERA

CROSS-REFERENCE TO RELATED APPLICATIONS

This application claims benefit of U.S. Provisional Patent Application Ser. No. 61/846,769, filed Jul. 16, 2013, which is incorporated by reference herein in its entirety.

BACKGROUND OF THE INVENTION

Field of the Invention

Embodiments of the present invention generally relate to auto-focus correction of a projector with the aid of a camera.

Description of the Related Art

Hand-held projectors, such as the DLP (Digital Light Processing) Pico Projector available from Texas Instruments, are gaining in popularity as such projectors are increasingly becoming available in light-weight portable consumer electronic devices such as smart phones and cameras. The projector on these devices may be used as a display mechanism to project digital content onto any suitable surface. Such projectors may require manual intervention to correctly focus on the projecting surface and focus correction may be needed each time the relative orientation of the projector/projecting surface changes.

SUMMARY

Embodiments of the present invention relate to methods and systems for auto-focus correction of a projector with the aid of a camera. In one aspect, a method of automatically focusing a projector in a projection system is provided that includes projecting, by the projector, a binary pattern on a projection surface, capturing an image of the projected binary pattern by a camera synchronized with the projector, computing a depth map from the captured image, and adjusting focus of the projector based on the computed depth map.

In one aspect, a projection system is provided that includes a projector configured to project a binary pattern into a scene, a camera configured to capture images of the binary pattern when projected by the projector, means for computing a depth map from an image captured by the camera, and means for adjusting focus of the projector based on the computed depth map.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
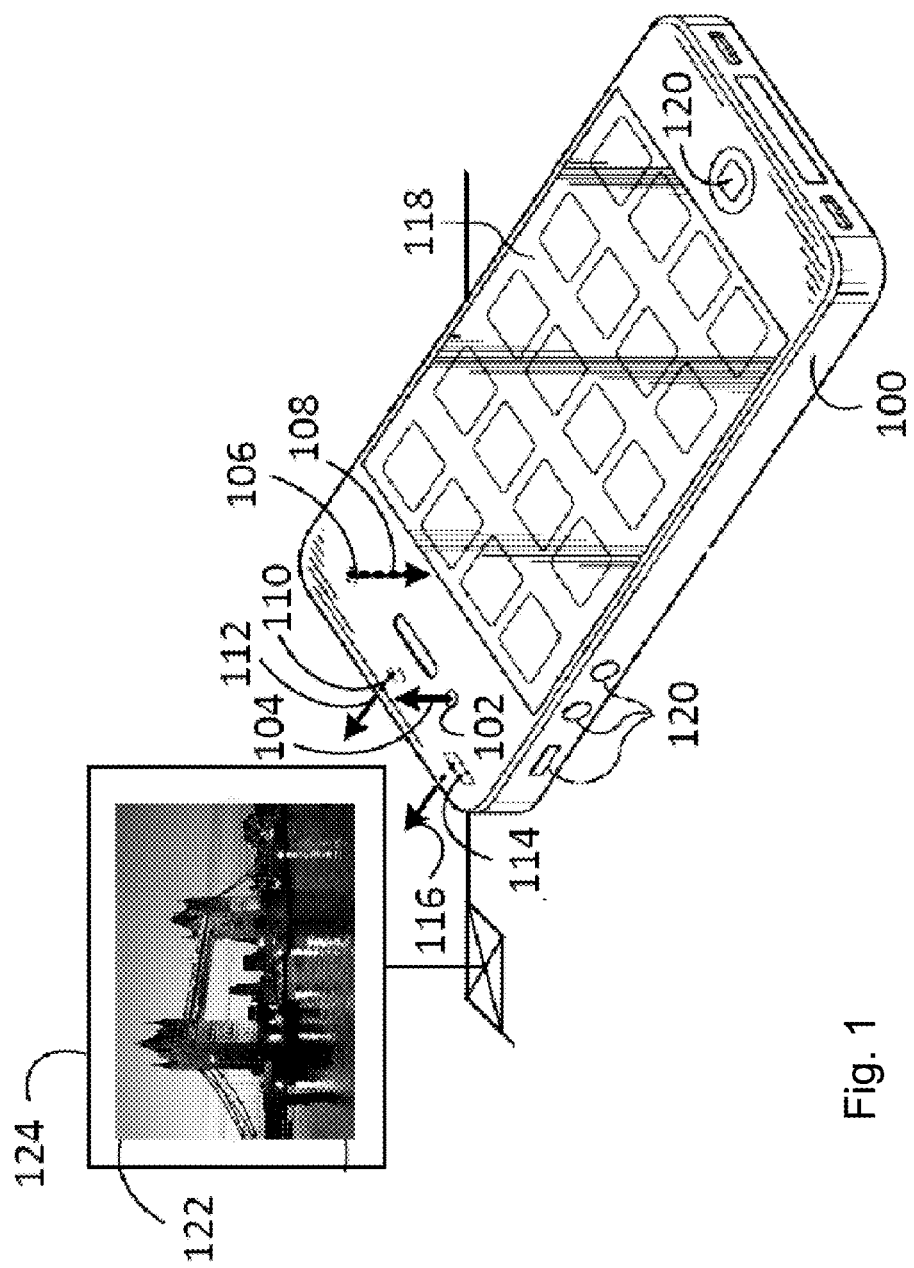
FIG. 1 is a perspective view of an example handheld projection system configured for camera-aided projector auto-focus correction.

Specific embodiments of the invention will now be described in detail with reference to the accompanying figures. Like elements in the various figures are denoted by like reference numerals for consistency.

Embodiments of the invention provide for automatic focusing of a projector in a handheld device with the aid of a camera and without the need for any manual user interaction. Examples of handheld devices that may include both a projector and a camera include digital still and digital video cameras, smart phones, and tablets. Because the camera may initially also not be in focus, the focus of the camera and the projector are corrected simultaneously. Projectors are typically used to project on flat smooth surfaces. Thus, it is difficult to use the independent auto focus algorithm of a camera to correct projector focus.

FIG. 1 is a perspective view of an example handheld projection device 100 configured for camera-aided projector auto-focus correction. More specifically, the handheld projection device 100 is configured to execute an embodiment of a method for camera-aided projector auto-focus correction as described herein. In this example, the handheld projection device 100 is embodied in a mobile smart phone. As shown in FIG. 1, the handheld projection device 100 includes a front-facing camera 102 (on the front of the system 100) that points in the direction indicated by arrow 104, a rear-facing camera 106 (on the back of the system 100) that points in the direction indicated by arrow 108 (substantially opposite the direction of arrow 104), and a top-facing camera 110 (on the top edge of the system 100) that points in the direction of arrow 112 (substantially orthogonal to the directions of arrows 104 and 108). In some embodiments, one or both of the front-facing camera 102 and the rear-facing camera 106 may not be present.

The handheld projection device 100 also includes a projector 114 (on the top edge of the system 100) that points in the direction of arrow 116 (substantially parallel to the direction of arrow 112). The projector 114 is configured to project a video stream 122 onto a surface 124 under the control of the device 100. The projector 114 is also configured to project structured light patterns, e.g., a hierarchical binary pattern, onto the projection surface 124 under the control of the device 100 during the projection of the video stream 122. In some embodiments, the projector 114 is a light projector (e.g., pico projector) that is suitable for projecting video stream 122 onto a projection surface 124 under control of the device 100. An example of one suitable light projector is a DLP (Digital Light Processing) Pico Projector available from Texas Instruments, Inc. The use of a DLP pico projector to project structured light patterns is well known. For example, use of a DLP pico projector for structured light applications is described in the Texas Instruments application report "Using the DLP Pico 2.0 Kit for Structured Light Applications", DLPA021A, January 2010 (revised October 2011), available at www.ti.com/lit/an/dlpa021a/dlpa021a.pdf.

The top-facing camera 110 is configured to have a field of view (FOV) that substantially overlaps the FOV of the projector 114 such that the camera 110 can capture images of the video stream 122 being projected on the projection surface 124. Further, the top-facing camera 110 is configured to capture an image when the projector 114 projects a structured light pattern.

The handheld projection device 100 also includes a touch screen 118 (on the front of the system 100) and various buttons 120 for manually controlling operations of the device 100.

Figure 2:
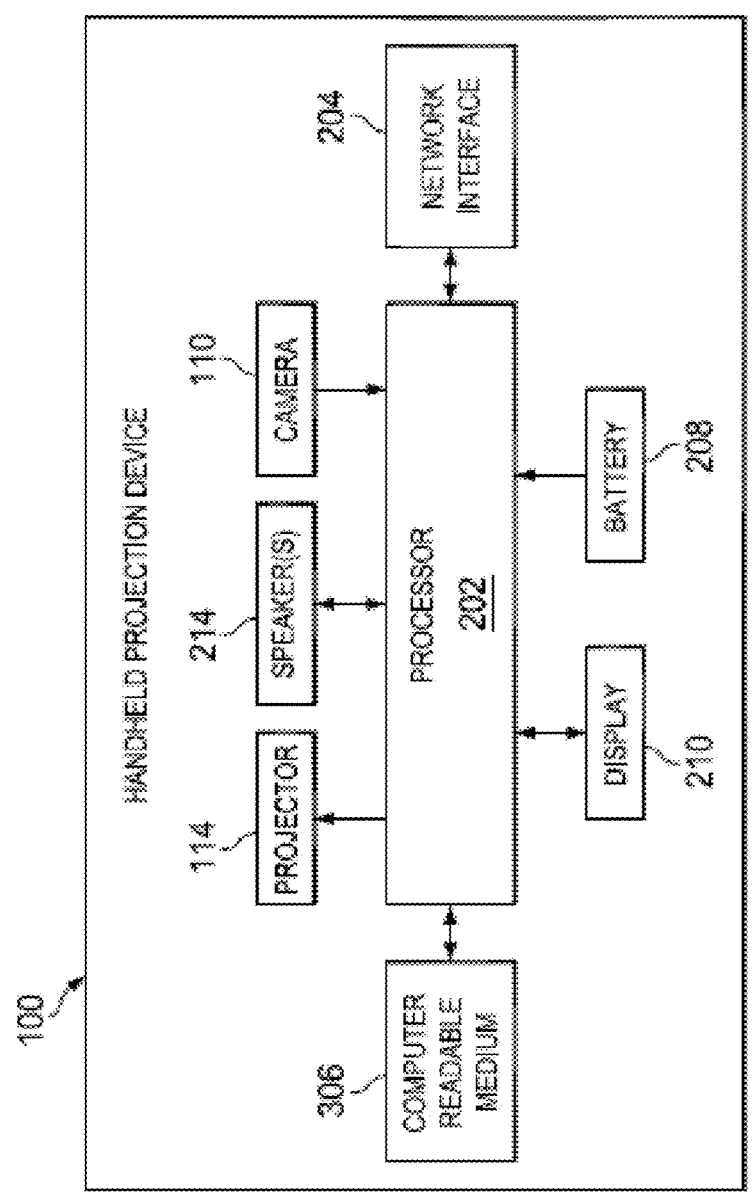
FIG. 2 is a block diagram of the handheld projection system of FIG. 1.

FIG. 2 is a block diagram of the handheld projection device 100. The device 100 includes various electronic circuitry components for performing system operations implemented in a suitable combination of software, firmware and hardware. Such components include a processor 202 (e.g., one or more microprocessors and/or digital signal processors) for executing software instructions that implement at least some system operations, a network interface 204 for communicating information to and from a network in response to signals from the processor 202, and a computer-readable medium 206, such as a nonvolatile storage device and/or a random access memory ("RAM") device, for storing software instructions programs and other information. The device 100 also includes a battery 308 providing power for the device 100, a display 210 that includes a screen for displaying information to a user and for receiving information from the user in response to signals from the processor 202, speaker(s) 214 for outputting sound waves in response to signals from the processor 302, the projector 114, and the camera 110. For simplicity, other cameras that may be in the device 100 are not shown.

As shown in FIG. 2, the processor 202 is connected to the computer-readable medium 206, the battery 208, and the display device 210, the speaker 214, the projector 114 and the camera 110. For clarity, although FIG. 2 shows the battery 208 connected to only the processor 202, the battery 208 may be further coupled to various other components of the device 100. Also, the processor 202 is coupled through the network interface 204 to a network (not specifically shown), such as the Internet or an intranet. For example, the network interface unit 204 communicates information by outputting information to, and receiving information from, the processor 202 and the network, such as by transferring information (e.g., instructions, data, signals) between the processor 202 and the network (e.g., wirelessly or through a USB interface).

In response to executing software instructions stored in the computer readable medium 206, the processor 202 causes the projector 114 to project the video stream 122 on the projection surface 124. The processor 202 also causes the projector 114 to insert structured light pattern frames, e.g., hierarchical binary pattern frames, interspersed with the projected video stream for use in auto-focus of the projector as described herein. The processor 202 also causes the camera 110 to capture images of the structured light pattern projected on the projection surface 124. The processor 202 further executes software instructions to cause the computation of the depth of the scene from the structured light pattern in each of the captured images, and to use the computed scene depths to perform automatic focus correction of the projector 114 and the camera 110. More specifically, in response to executing stored software instructions, the processor 202 causes the method of FIG. 3 to be performed by the device 100.

Figure 3:
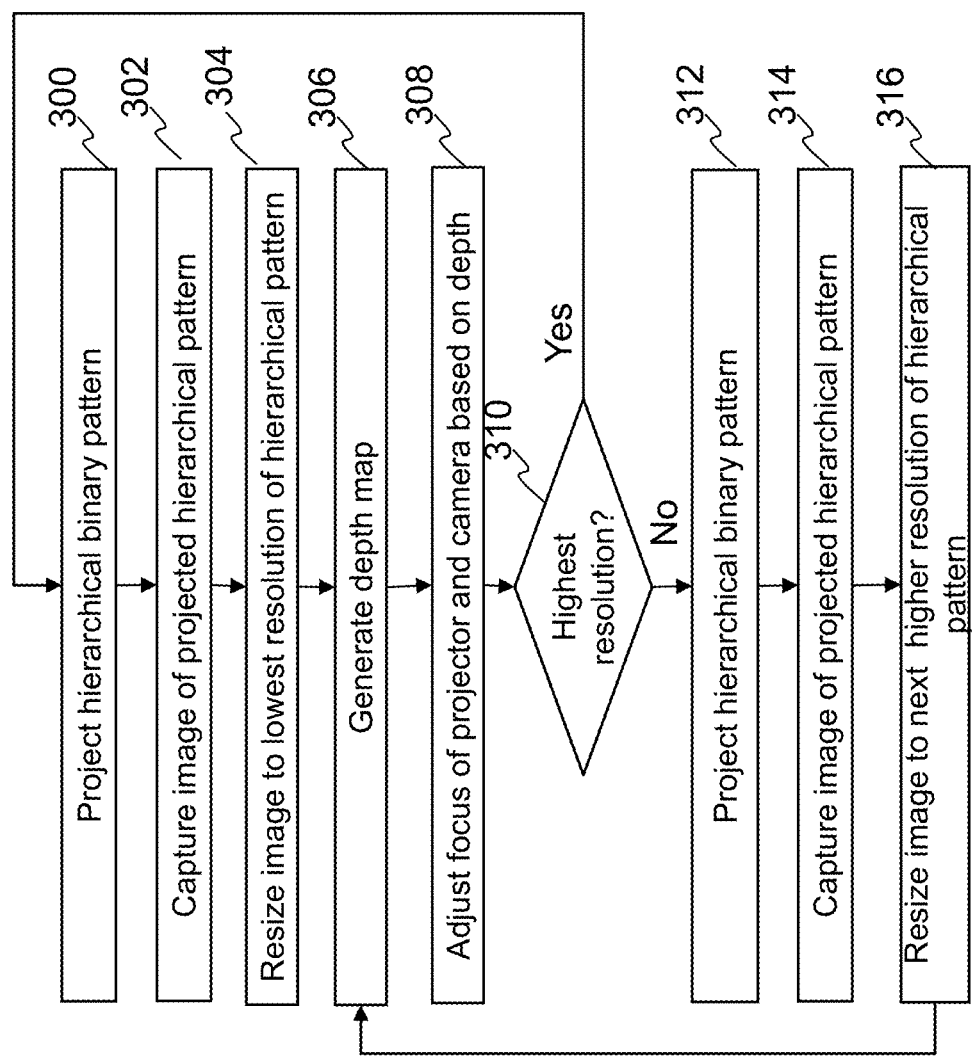
FIG. 3 is a flow diagram of a method for camera-aided projector auto-focus correction that may be executed by the handheld projection system of FIGS. 1 and 2.

FIG. 3 is a flow diagram of a method for camera-aided projector auto-focus correction that may be executed in a projection device that also includes a camera, e.g., the handheld projection device 100 of FIGS. 1 and 2. The method may be repetitively performed while the projector is projecting a video stream on a projection surface. In general, the method generates depth images at various resolutions from captured images of a pre-determined hierarchical binary pattern projected on the projection surface and uses the depth images to focus the projector and the camera. The projector projects the hierarchical binary pattern periodically interspersed between projected frames of the video stream. The projector may project the pattern at a higher frame rate than the video stream projection frame rate such that the binary pattern is not visible to someone viewing the projected images. The camera is synchronized with the projector such that the camera captures an image of the scene when the pattern is projected.

A hierarchical binary pattern is a binary pattern having low-frequency and high-frequency components. More specifically, a hierarchical binary pattern contains a mixture of low to high spatial frequency patterns and retains a definite structure under scaling changes. Such a pattern may be generated off-line using a method for generating a hierarchical binary pattern as described in U.S. patent application Ser. No. 14/312,546, filed Jun. 23, 2014, which is incorporated by reference herein.

As described in more detail in the '546 patent application, a hierarchical binary pattern is generated by iteratively scaling a lower resolution binary pattern to multiple successively higher resolutions. The number of resolutions used to generate the hierarchical binary pattern is implementation dependent. Further, the scaling is performed such that a simple down sampling of the hierarchical binary pattern to a resolution used in generating the hierarchical pattern results in the original pattern at that resolution.

More specifically, to generate a hierarchical binary pattern, a binary black and white pattern is generated at the lowest resolution of the multiple resolutions to be used to achieve the desired resolution of the hierarchical pattern. Any suitable binary pattern may be used that will contain low spatial frequencies when scaled up to the full resolution. This binary pattern is then scaled to the next higher resolution by replacing the ones and zeros using pre-defined templates. A template defines a pattern of 0's and 1's that will replace a single bit in a binary pattern. Each bit in the binary pattern is replaced according to a template to scale the binary pattern to the next highest resolution. Within a template, any suitable pattern of 0's and 1's may be used with the restriction that a template for replacing one values has more ones than zeros and a templates for replacing zero values has more zeros than ones.

If the scaled binary pattern is not at the desired resolution, the resulting binary pattern is scaled to the next higher resolution using the templates. The scaling is repeated until the scaled binary pattern is at the desired resolution. The final scaled binary pattern is the hierarchical binary pattern.

Figure 4:
FIG. 4 is an example of a hierarchical binary pattern that may be used in the methods of FIG. 3.
Figure 4:
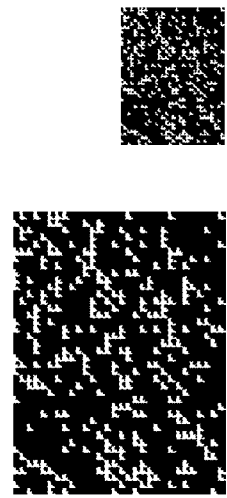
Figure 4:
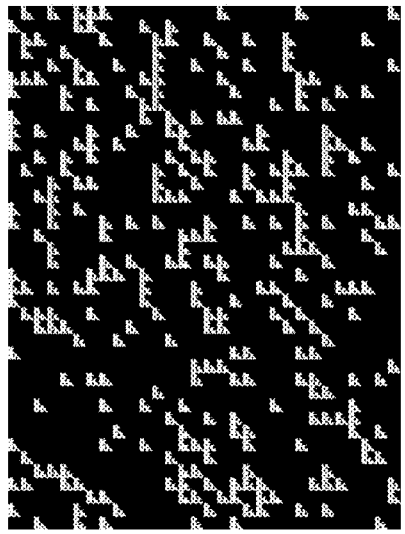
Figure 5:
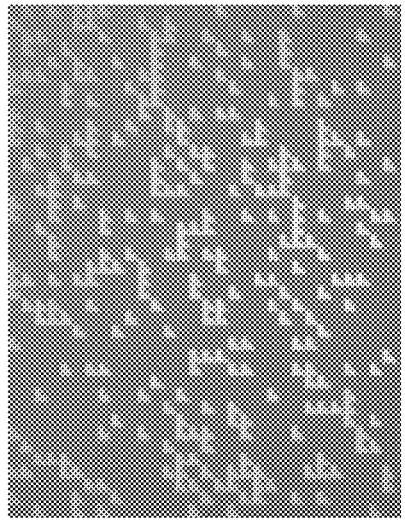
FIG. 5 is an example comparing captured pattern images when a camera-projector pair are out of focus and when the pair are in focus.
Figure 5:
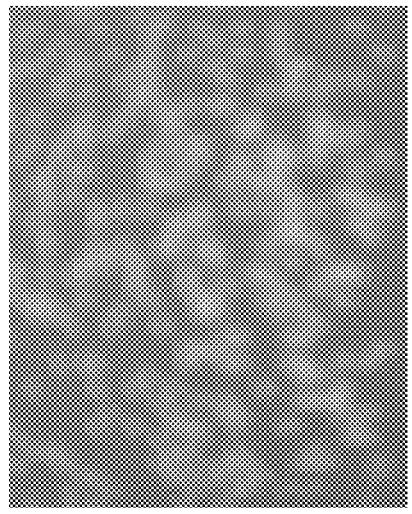

Using a hierarchical pattern for focusing the projector and camera is advantageous because if the camera and the projector are not in focus, higher frequency details in the projected pattern are lost in the captured image. However, lower frequency details are retained. FIG. 4 is an example of a hierarchical binary pattern generated by scaling a lower resolution pattern to two successively higher resolutions. This figure shows the full resolution hierarchical binary pattern and the pattern down sampled to each of the resolutions used to generate the pattern. Note that the down sampled versions of the pattern retain the structure of the pattern. FIG. 5 is an example comparing a captured image of the hierarchical binary image when the camera and projector are out of focus to a captured image of the pattern when the camera and the projector are both in focus.

Because the hierarchical binary pattern retains its structure when down sampled to a resolution used to generate the pattern, the pattern and a captured defocused image of the pattern can be down sampled to a lower resolution and a suitable structured light depth estimation algorithm used to generate a depth map for the projection surface at the lower resolution. This depth can be used to improve the focus the projector and the camera. With the improved focus, higher frequency details can be extracted from a subsequent captured image of the pattern at a higher resolution to estimate depth with greater accuracy.

Referring again to FIG. 3, initially the pre-determined hierarchical binary pattern is projected 300 by the projector and an image of the scene containing the projected hierarchical pattern is captured 302 by the camera. The projection and capturing is performed such that the captured image contains the projected pattern and the projection surface within the field of view of the camera. The captured image is then resized 304 to the lowest resolution used to generate the hierarchical binary pattern. Resizing of the captured image may include rectifying the captured image to match the dimensions of the projected pattern and down sampling the rectified captured image to the lowest resolution used to generate the hierarchical binary pattern. A depth map of the projection surface is then generated 306 from the resized captured image and the hierarchical binary pattern down sampled to the resolution of the resized captured image using a structured light depth estimation algorithm. Any suitable structured light depth estimation technique may be used. For example, an algorithm based on sum of absolute differences (SAD) or on block matching can be use to generate a disparity map, which can then be converted to a depth map.

The focus of the projector and the camera is then adjusted 308 based on the depth map. More specifically, the depth map can be used to estimate the distance from the projector and the camera to the projection surface. For example, the depths in depth map can be averaged to find the estimated distance or the depth at a central location in the depth map can be used as the estimated distance. Given the estimated distance, the lens of the projector is moved to a focus position corresponding to the estimated distance. More specifically, a projector typically has multiple lens locations and a stepper motor that can be used to move the lens to a specific location. Further, there is a known mapping of lens location to distance from the projection surface. Once the estimated distance is known, the lens is moved to a location corresponding to the estimated distance. Note that if the lens is already at the location, no action is taken. The lens of the camera may be adjusted in a similar manner.

If the resolution of the captured image and the hierarchical binary image used for computing the depth map is not the highest resolution 310 of the hierarchical binary image, the process is repeated for the next highest resolution used to generate the hierarchical binary image. That is, the hierarchical binary pattern is projected 312, an image of the scene containing the projected pattern is captured 314, and the captured image is then resized 316 to the next higher resolution used to generate the hierarchical binary pattern. A depth map of the projection surface is then generated 306 using a suitable structured light depth estimation algorithm applied to the resized captured image and the hierarchical binary pattern down sampled to the resolution of the resized captured image. The focus of the projector and the camera are then adjusted 308 based on the depth map.

If the resolution of the captured image and the hierarchical binary image used for computing the depth map is the highest resolution 310 of the hierarchical binary image, the method is repeated starting with the lowest resolution used to generate the hierarchical binary image.

Figure 6:
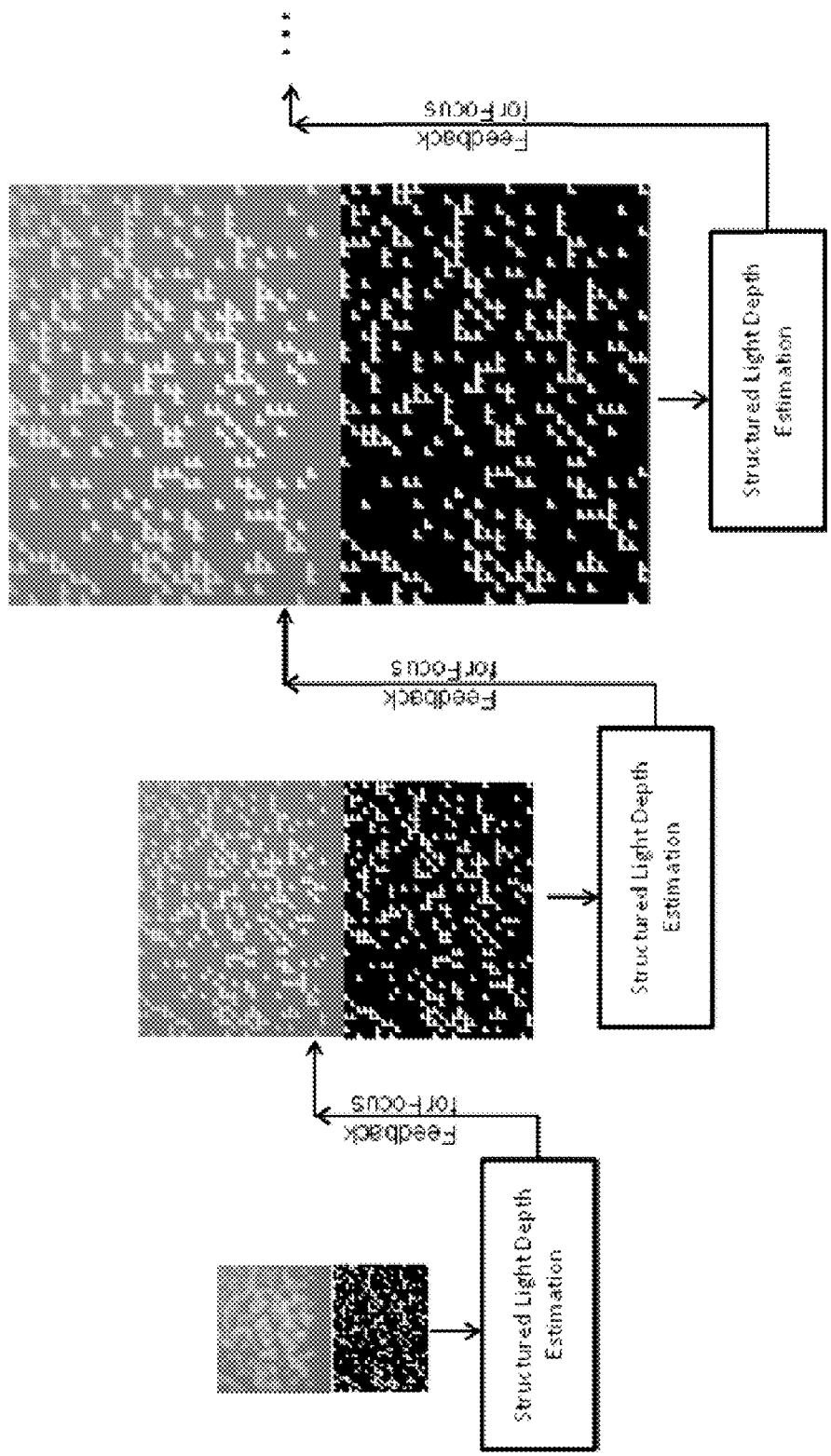
FIG. 6 is an example of applying the method of FIG. 3.

FIG. 6 is an example illustrating iterative improvement of projector and camera focus using the method of FIG. 3 and the hierarchical binary pattern of FIG. 4.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the projected pattern used for automatic focus of the projector is a hierarchical binary pattern. One of ordinary skill in the art will understand embodiments in which the projected pattern is a single low frequency binary pattern. Without the higher frequency components of a hierarchical binary image, the method may not converge to the optimal projector focus. However, such single low-frequency binary patterns may be sufficient for a projector with a small focus range in which the single low-frequency pattern can be used to get a good estimation of the distance to the projection screen.

In another example, embodiments have been described in which the automatic focus correction is performed continuously. One of ordinary skill in the art will understand embodiments in which the automatic focus correction is performed one time when the projector is activated. Further, one of ordinary skill in the art will understand embodiments in which the automatic focus correction is performed periodically and/or responsive to determining that the projector is out of focus and/or responsive to a user focus request.

In another example, embodiments have been described herein in which the handheld projection system is embodied in a mobile smart phone. One of ordinary skill in the art will understand embodiments in which the handheld projection system is, for example, a standalone projection device that includes a camera for capturing images of the projected frames or a digital camera that includes a projector. One of ordinary skill in the art will also understand embodiments in which the handheld projection system is embodied in sleeve or clip-on unit that may be physically coupled to a smart phone.

In another example, embodiments have been described herein in which the projector and the camera are placed on the top edge of the handheld projection system. One of ordinary skill in the art will understand embodiments with differing placement of the projector and camera in the projection system. For example, the projector and camera may be placed on the top or bottom of the projection system or on other edges so long as the field of view of the camera substantially overlaps that of the projector.

In another example, embodiments have been described here in which the projected frames are assumed to be from a video stream. One of ordinary skill in the art will understand embodiments in which the projected frames are individual images, e.g., slides in a presentation.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of automatically focusing a projector in a projection system, the method comprising:
    projecting, by the projector, a pre-determined hierarchical binary pattern on a projection surface;
    capturing an image of the projected pre-determined hierarchical binary pattern by a camera synchronized with the projector;
    resizing the captured image to a resolution used to form the pre-determined hierarchical binary pattern;
    computing a depth map from the resized captured image and the predetermined hierarchical binary pattern down-sampled to the resolution; and
    adjusting a focus of the projector based on the computed depth map.

2. The method of claim 1, further comprising adjusting a focus of the camera based on the computed depth map.

3. The method of claim 1, wherein the pre-determined hierarchical binary pattern was formed by iteratively scaling a lower resolution binary pattern to multiple successively higher resolutions.

4. A projection system comprising:
    a projector configured to project a pre-determined hierarchical binary pattern into a scene;
    a camera configured to capture an image of the pre-determined hierarchical binary pattern when projected by the projector;
    means for resizing the captured image to a resolution used to form the pre-determined hierarchical binary pattern;
    means for computing a depth map from the resized captured image and the predetermined hierarchical binary pattern down-sampled to the resolution; and
    means for adjusting a focus of the projector based on the computed depth map.

5. The projection system of claim 4, further comprising means for adjusting a focus of the camera based on the computed depth map.

6. The projection system of claim 4, wherein the pre-determined hierarchical binary pattern was formed by iteratively scaling a lower resolution binary pattern to multiple successively higher resolutions.

7. A device comprising one or more processors configured to:
    capture an image of a projected pre-determined hierarchical binary pattern that is projected by a camera synchronized with a projector;
    resize the captured image to a resolution used to form the pre-determined hierarchical binary pattern;
    compute a depth map from the resized captured image and the predetermined hierarchical binary pattern down-sampled to the resolution; and
    adjust a focus of the projector based on the computed depth map.

8. The device of claim 7, wherein the one or more processors are further configured to adjust a focus of the camera based on the computed depth map.

9. The device of claim 7, wherein the pre-determined hierarchical binary pattern was formed by iteratively scaling a lower resolution binary pattern to multiple successively higher resolutions.

* * * * *